P. A. LORENZEN.
STANCHION.
APPLICATION FILED AUG. 9, 1909.
949,586.
Patented Feb. 15, 1910.
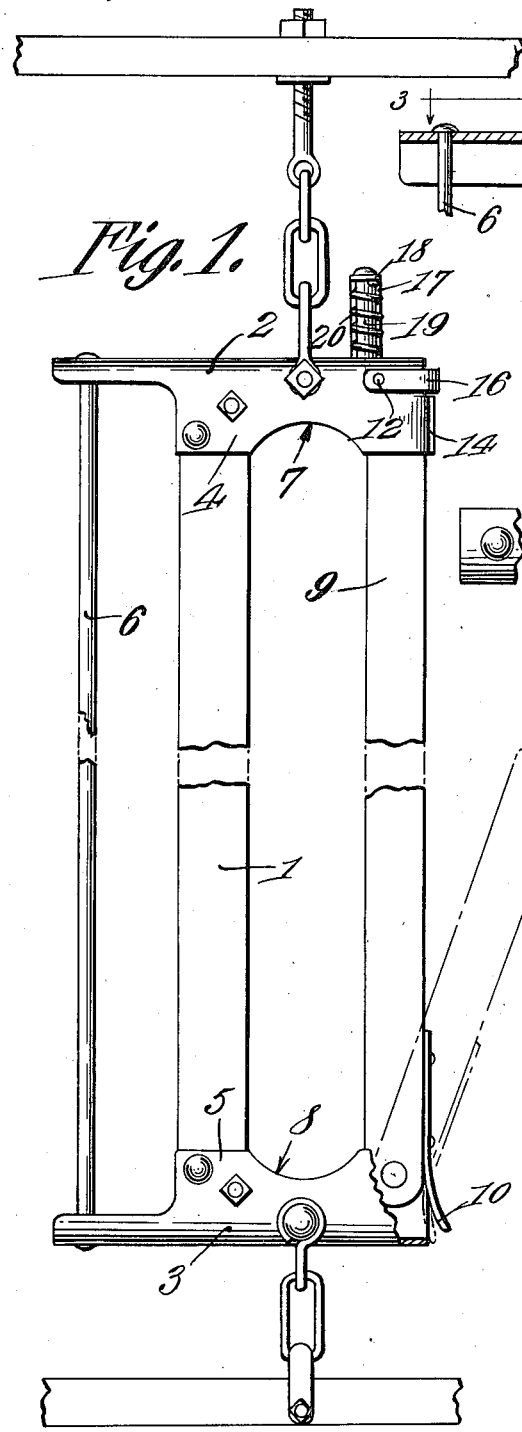
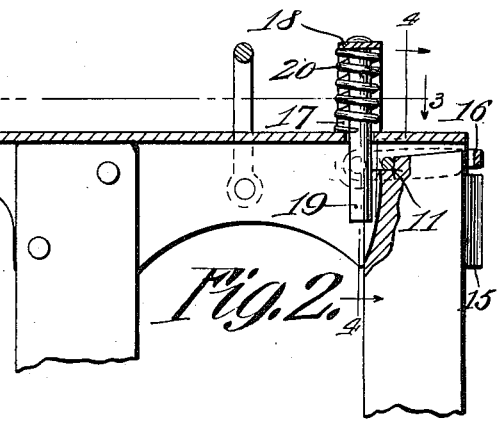
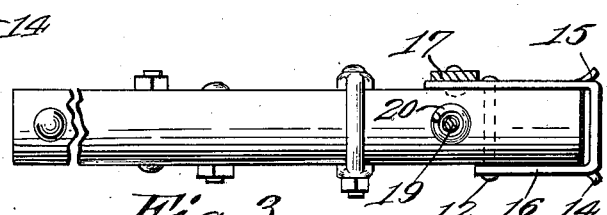
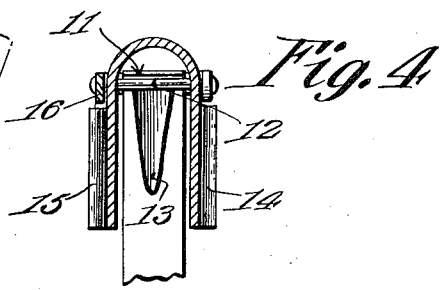
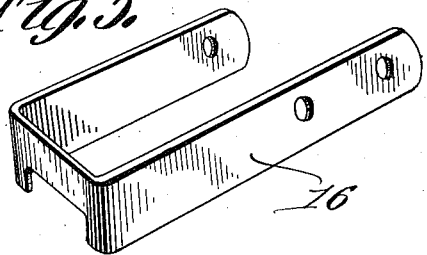
Witnesses
John C. Firmin
C. H. Griesbauer
Inventor
Peter A. Lorenzen.
by H. B. Willson & Co
Attorneys

UNITED STATES PATENT OFFICE.

PETER A. LORENZEN, OF SHEBOYGAN, WISCONSIN, ASSIGNOR OF ONE-HALF TO GEORGE MEGGERS, OF SHEBOYGAN, WISCONSIN.

STANCHION.

949,586.  Specification of Letters Patent.  Patented Feb. 15, 1910.

Application filed August 9, 1909. Serial No. 511,945.

*To all whom it may concern:*

Be it known that I, PETER A. LORENZEN, a citizen of the United States, residing at Sheboygan, in the county of Sheboygan and State of Wisconsin, have invented certain new and useful Improvements in Stanchions; and I do declare the following to be a full, clear, and exact description of the invention, such as will enable others skilled in the art to which it appertains to make and use the same.

This invention relates to improvements in cattle stanchions.

The object of the invention is to provide a cattle stanchion or tying device which may be connected at opposite ends to any suitable support and which may be quickly and easily opened or closed to permit the attachment of the same to the head of the cow or other animal to be tied.

Another object of the invention is to provide a simply constructed locking device for ejecting the movable bar simultaneously with the release thereof.

With these and other objects in view, the invention consists of certain novel features of construction, combination and arrangement of parts, as will be more fully described and particularly pointed out in the appended claims.

In the accompanying drawings, Figure 1 is a front elevation of this improved cattle stanchion with parts broken out; Fig. 2 is a detail vertical sectional view thereof; Fig. 3 is a horizontal section taken on the line 3—3 of Fig. 2; Fig. 4 is a detail sectional view of the locking mechanism taken on line 4—4 of Fig. 2; Fig. 5 is a detail perspective view of the bail-shaped locking member.

In the embodiment illustrated a main stationary side bar 1 is shown composed of wood or any other suitable material and having secured to the opposite ends thereof sheet metal cross bars 2 and 3 which are preferably U-shaped in cross section each having flanges 4 and 5 adapted to embrace the opposite ends of the side bar 1 and bolted or otherwise secured thereto. These cross bars 2 and 3 extend at one end beyond said side bars and a brace rod 6 connects the ends of the two members as is clearly shown in Figs. 1 and 2 of the drawing. These cross bars 2 and 3 are provided intermediately of their ends on their inner edges with curved recesses 7 and 8 to adapt them to comfortably fit the neck of the animal to be tied.

A movable side bar 9 is pivotally connected at one end to the free end of the lower cross bar 3 between the flanges thereof and a metal strip 10 is secured to the outer edge of the bar 9 with its lower end extending beyond the lower edge of the cross bar 3 and which is designed to act as a stop for limiting the outward movement of the side bar. The free end of this strip is preferably bent outwardly as shown to provide for a sufficient opening of the movable member to permit the insertion and release of the head of the animal to be tied. The outer corner of the lower end of the side bar 9 is rounded as shown in Fig. 1 to permit it to swing freely outward to provide for the opening thereof. The upper end of this movable side bar 9 is preferably beveled and is provided at its inner corner with a notch 11 adapted to engage a pin 12 which extends transversely across the upper cross bar 2 between the legs or arms thereof near its outer end and which serves as a stop for limiting the inward movement of the side bar 9. The inner edge of the upper end of the side bar 9 is preferably provided with a groove 13 extending longitudinally thereof and which is adapted to be engaged by an ejecting pin of a locking device to be described.

The free end of the upper cross bar 2 is open and the side members or flanges thereof are flared outwardly to facilitate the insertion of the movable side bar 9 therebetween. The upper portion of the outer edges of these flanges are preferably cut out as shown thereby providing stops 14 and 15 for a purpose to be described. A bail shaped member 16 extends around the cut out portion of the cross bar 2 and the free ends thereof are pivotally connected with opposite sides of said bar preferably by means of the pin 12 which forms a stop to limit the inward movement of the member 9. One leg of this member 16 is preferably made longer than the other and projects beyond the pivot pin 12. An L-shaped operating member 17 is pivotally connected at the free end of its long arm to the free end of the extension of the member 16 and is designed to be moved vertically for raising and lowering said member 16 to cause it to move into and out of the path of the free end of the side bar 9. The short arm 18 of the member 17 extends above the top portion of the cross bar 2 and a pin 19 is secured to said arm and extends through an aperture in the top of the cross bar 2 at the rear of the pin 12 and projects some distance between the flanges of said cross bar, the aperture through which said pin 19 passes being sufficiently large to permit a rocking movement of the pin therein. A coiled spring 20 is arranged around the pin 19 between the lower face of the arm 18 and the upper face of the cross bar 2 and exerts its tension to force said arm normally upward to its full extent thereby holding the bail shaped member 16 in operative engagement with the side bar 9. When this pin 19 is depressed against the tension of the spring 20 the L-shaped member 17 is moved downwardly thereby lifting the member 16 and disengaging it from the side bar 9 and simultaneously the free end of the pin 19 engages the groove at the inner edge of said side bar 9 and forces it outwardly to permit it to be readily opened for the purpose desired.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claims.

I claim as my invention;

1. A cattle stanchion comprising upper and lower cross bars, a stationary side bar fixed thereto, a movable side bar pivotally connected to one of said cross bars at a point spaced from the stationary side bar and locking and ejecting means carried by the other cross bar and comprising a bail shaped member pivotally connected to swing in a vertical plane and adapted to extend around one end of said cross bar and an operating member connected with said bail shaped member and operable to raise said bail shaped member out of engagement with said movable side bar and to simultaneously eject said side bar out of engagement with said bail shaped member.

2. A cattle stanchion comprising a stationary side bar, cross bars extending laterally from opposite ends of said stationary side bar in the same direction, a movable side bar pivotally connected at one end to the free end of one of said cross bars, the other cross bar being approximately U-shaped in cross section and adapted to receive the free end of said movable side bar between the arms thereof, a bail shaped member extending around the free end of said cross bar with the arms thereof pivotally connected to said cross bar, one of said arms extending laterally beyond its pivotal connection, an L-shaped operating member pivotally connected at the free end of one arm to the extension on the arm of said bail shaped member, a pin secured to the other arm of said operating member and extending through the upper wall of said cross bar into position to engage the rear edge of said movable side bar and a spring arranged to bear against said cross bar and said operating member.

In testimony whereof I have hereunto set my hand in presence of two subscribing witnesses.

PETER A. LORENZEN.

Witnesses:
FELIX BENFEY,
LILY KOEHN.